United States Patent [19]
Brazas, Jr.

[11] Patent Number: 4,979,788
[45] Date of Patent: Dec. 25, 1990

[54] ACHROMATIC MODE-INDEX ELEMENTS FOR INTEGRATED OPTICAL SYSTEMS

[75] Inventor: John C. Brazas, Jr., Rochester, N.Y.

[73] Assignee: Eastman Kodak Company, Rochester, N.Y.

[21] Appl. No.: 488,164

[22] Filed: Mar. 5, 1990

[51] Int. Cl.$^5$ .................. G02B 6/10; B32B 27/08; F21V 9/00

[52] U.S. Cl. .................. 350/96.12; 350/96.11; 350/96.18; 350/96.34; 428/474.4; 428/220; 252/582

[58] Field of Search .............. 350/96.11, 96.12, 96.15, 350/96.18, 96.10, 96.34; 428/220, 474.4; 252/582, 586, 587, 589

[56] References Cited

U.S. PATENT DOCUMENTS

| | | | |
|---|---|---|---|
| 4,028,476 | 6/1977 | Kleinschmidt et al. | 428/220 |
| 4,141,621 | 2/1979 | Aagard et al. | 350/96.12 |
| 4,279,464 | 7/1981 | Colombini | 350/96.12 X |
| 4,453,801 | 6/1984 | Verber et al. | 350/96.12 |
| 4,455,063 | 6/1984 | Wood et al. | 350/96.12 |
| 4,609,252 | 9/1986 | Wong et al. | 350/96.12 |
| 4,610,502 | 9/1986 | Nicia et al. | 350/96.12 |
| 4,611,883 | 9/1986 | Myer | 350/96.12 |
| 4,865,406 | 9/1989 | Khanarian et al. | 350/96.12 |

OTHER PUBLICATIONS

R. Ulrich and R. J. Martin, Applied Optics, vol. 10, No. 9, p. 2077 (1971).
D. W. Hewak and J. W. Y. Lit, Applied Optics, vol. 26, No. 5, p. 833 (1987).

*Primary Examiner*—Brian Healy
*Attorney, Agent, or Firm*—Warren W. Kurz

[57] ABSTRACT

Mode-index optical elements comprise an optical waveguide having a optical overlay of substantially uniform thickness. The contour of the overlay in the plane of the overlay controls the direction of propagation of radiation within the waveguide. According to the invention, mode-index optical elements are optimally achromatized (i.e., rendered as insensitive as possible to radiation wavelength changes) over a desired wavelength rqange by properly selecting the respective thicknesses and bulk refractive indices of the overlay and waveguide components. Specifically, such parameters are chosen so that, for a given waveguide substrate (e.g., quartz) and superstrate (e.g., air), the deviation of the ratio of the respective effective refractive indices of the waveguide element ($N_E$) and waveguide material ($N_{WG}$) from a mean or nominal value is minimized over the desired wavelength range of achromatization.

7 Claims, 12 Drawing Sheets

ACHROMATIC MODE-INDEX ELEMENTS FOR INTEGRATED OPTICAL SYSTEMS

BACKGROUND OF THE INVENTION

The present invention relates to improvements in integrated optical waveguide devices (e.g. waveguide lenses, prisms, beamsplitters, etc.) for controlling the propagation of radiation in an optical waveguide. More particularly, this invention relates to the optimal achromatization of such devices, whereby the effect of such a device on propagating radiation is minimally dependent on changes in radiation wavelength over a predetermined wavelength range.

In recent years, considerable attention has been directed to the field of integrated optics and the problems associated with precisely controlling the propagation of radiation in slab-type optical waveguides. A variety of different waveguide devices (e.g. prisms and lenses) have been disclosed for reflecting and refracting a beam of radiation within a waveguide, e.g., for purpose of changing the direction of propagation, shaping the wavefront, or bringing the radiation to a focus. Waveguide lenses are generally classed into four types, viz., mode-index, geodesic, Luneburg, and Bragg-grating. The optical elements of interest here are of those of the mode-index variety.

Mode-index devices control the direction or propagation of a wavefront travelling in a waveguide by controlling the effective refractive index encountered by such wavefront in the waveguide. Such devices can take the form of a shaped overlay of uniform thickness situated atop the waveguide. They are described, e.g., by R. Ulrich and R. J. Martin in Applied Optics, Vol. 10, No. 9, p. 2077 (1971).

Ulrich and Martin describe a three-layer waveguide assembly comprising a glass substrate, a transparent thin-film waveguide disposed over a portion of the substrate, and a surrounding medium or "superstrate", typically air. They note that the propagation of light within the waveguide can be described within the limits of geometrical optics by an effective refractive index, N, whose value depends on thickness of the waveguide. By providing a step change (i.e. a sudden increase or decrease) in the waveguide thickness, and by properly shaping the thickness profile at the step boundary, the direction of propagation in the waveguide can be controlled much like conventional lenses and prisms control the propagation of light in bulk optical systems. Ulrich and Martin mention that, by properly choosing the film thickness at both sides of the step, one can produce either an unusually large wavelength dispersion, or achromatic refraction. While some degree of achromatization may be achieved by appropriately varying the thickness of the waveguide in a three-layer system, the wavelength range over which achromatization can be realized is relatively small, typically less than about 25 nm. Moreover, in a three-layer system where the waveguide thickness is selected to support only a single mode of propagation, relatively minor variations in the waveguide thickness from a nominal value, the sort of variation that is difficult to avoid using conventional fabrication processes, can greatly affect the refractive power of the devices.

The dispersion properties of a four-layer thin-film waveguide assembly are described by D. W. Hewak and J. W. Y. Lit in Applied Optics, Vol. 26, No. 5, p. 833 (1987). In a four-layer assembly, the "step change" in waveguide thickness mentioned above with regard to a three-layer assembly is provided by an optical overlay comprising a material different from the waveguide material. Hewak and Lit present a formula describing the variation in the effective refractive index with respect to any physical parameter with which the refractive index of any layer or the thickness of the guiding layers may vary. They examine the chromatic dispersion of a Luneburg lens, i.e., a mode-index lens comprising a dome-shaped overlay. From their model, they conclude that diffraction limited focusing of such a lens can better be achieved over the 0.70-0.84 micron wavelength range by a three-layer waveguide assembly in which, as mentioned, the overlay is of the same refractive index as the underlying waveguide. There is no disclosure in the Hewak and Lit article of how one might achieve achromatization in a four-layer assembly in which the overlay element has a substantially uniform thickness. Moreover, the discussion of achromatization of their Luneberg lens is limited to spot quality or "spherochromism," not axial or longitundinal chromatic aberration.

SUMMARY OF THE INVENTION

In view of the foregoing discussion, an object of this invention is to provide an improved mode-index optical element which is optimally achromatized over a relatively broad wavelength range (e.g., up to several hundred nanometers) so that the effect of such element on the direction of propagation of a beam of radiation travelling in a single-mode optical waveguide is minimally dependent on radiation wavelength shifts or selection within such range.

The preferred mode-index optical element of the invention is basically a four-layer waveguide assembly comprising a substrate, a single-mode optical waveguide overlying the substrate, a flat (i.e., uniformly thick) optical overlay disposed atop a portion of the waveguide, and a superstrate (e.g., air) surrounding the waveguide and overlay. The overlay is contoured in the plane of the overlay to achieve a desired change of direction of radiation propagating in the waveguide. Both the waveguide and overlay layers have effective refractive indices which vary as a function of the wavelength of radiation passing therethrough and the respective thicknesses of such layers. According to the invention, the respective optical materials and thicknesses of the waveguide and overlay are chosen so that, for a given substrate and superstrate, the deviation of the ratio of the effective refractive index of the four-layer element ($N_E$) to the effective refractive index of the waveguide ($N_{WG}$) from a mean or nominal value is minimized over the desired wavelength range of achromatization. When such a condition is satisfied, the element is "optimally" achromatized for that particular wavelength range. Preferably, the respective refractive indices of the waveguide and overlay materials differ by at least 0.05 over the desired wavelength range to provide a reasonable refracting power and, in the case of lenses, to minimize the curvature of the overlay lens.

The invention and its advantages will become more apparent to those skilled in the art from the ensuing detailed description of preferred embodiments, reference being made to the accompanying drawings.

PREFERRED EMBODIMENTS

Figure 1:
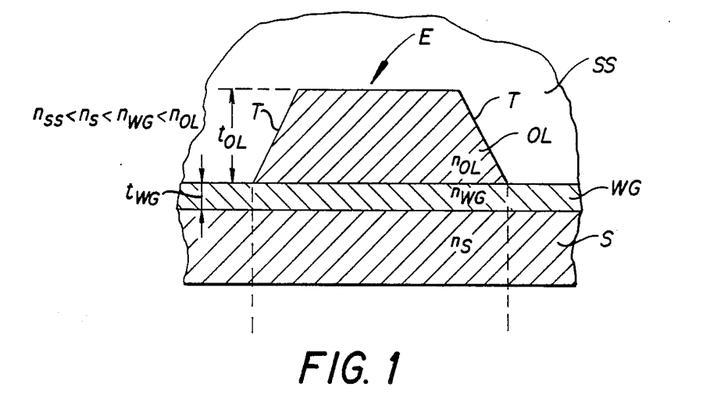
FIGS. 1 and 2 are cross-sectional and top perspective illustrations of a four-layer mode-index lens embodying the invention.
Figure 2:
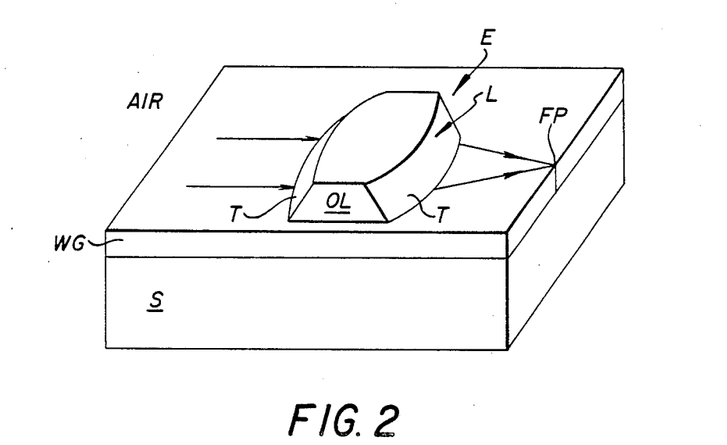
Figure 3:
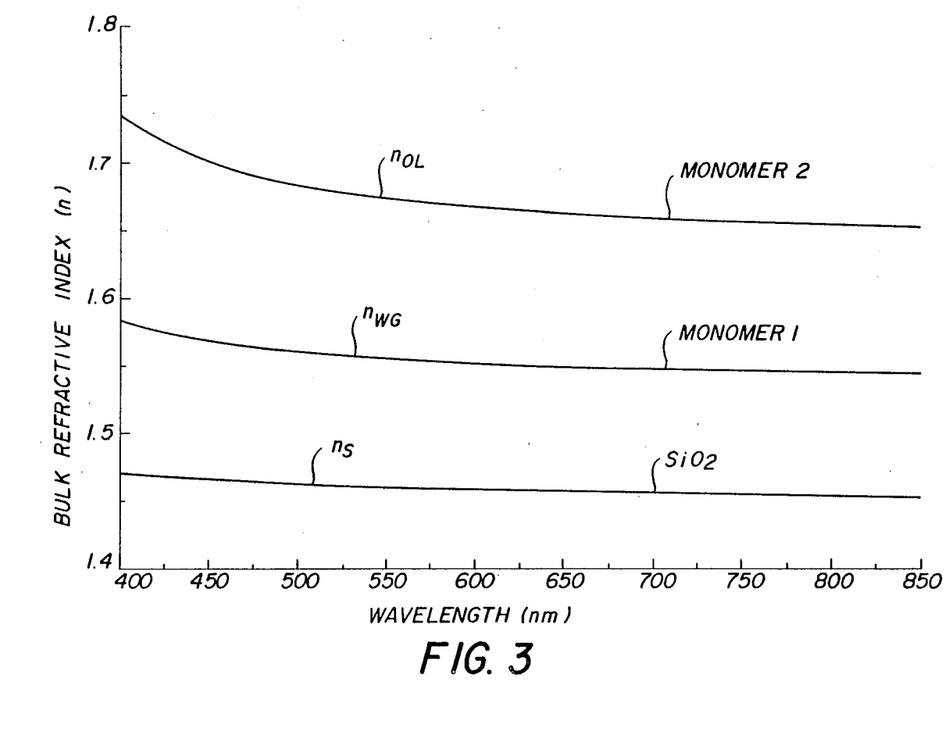
FIG. 3 is a series of dispersion curves illustrating the relationship between wavelength and bulk refractive index for a preferred substrate, waveguide and overlay materials.

Referring now to the drawings, FIGS. 1 and 2 illustrate a four-layer optical waveguide assembly which defines an achromatized mode-index optical element E, in this case a lens L. The four-layers of such assembly comprise a relatively thick supporting substrate S, an overlying thin-film waveguide WG, a shaped overlay OL disposed atop the waveguide, and a surrounding "superstraight" SS, such as air. The respective bulk indices of refraction of the layers, i.e., $n_S$, $n_{WG}$, $n_{OL}$ and $n_{SS}$, are chosen to satisfy the relationship, $n_{SS} \leq n_S < n_{WG} < n_{OL}$, as shown in FIG. 3 for certain preferred materials. In most cases, the superstrate is understood to be air where $n_{SS} = 1.0$.

Substrate S comprises a material having a relatively low bulk index of refraction $n_S$ and low wavelength dispersion, $dn_S/d\lambda$, over the wavelength range $\Delta\lambda$ through which achromatization is to be achieved. Fused quartz and thermally grown silicon dioxide are preferred substrate materials. The thickness of the substrate is non-critical and typically varies between 0.1 and 10 millimeters.

Figure 4:
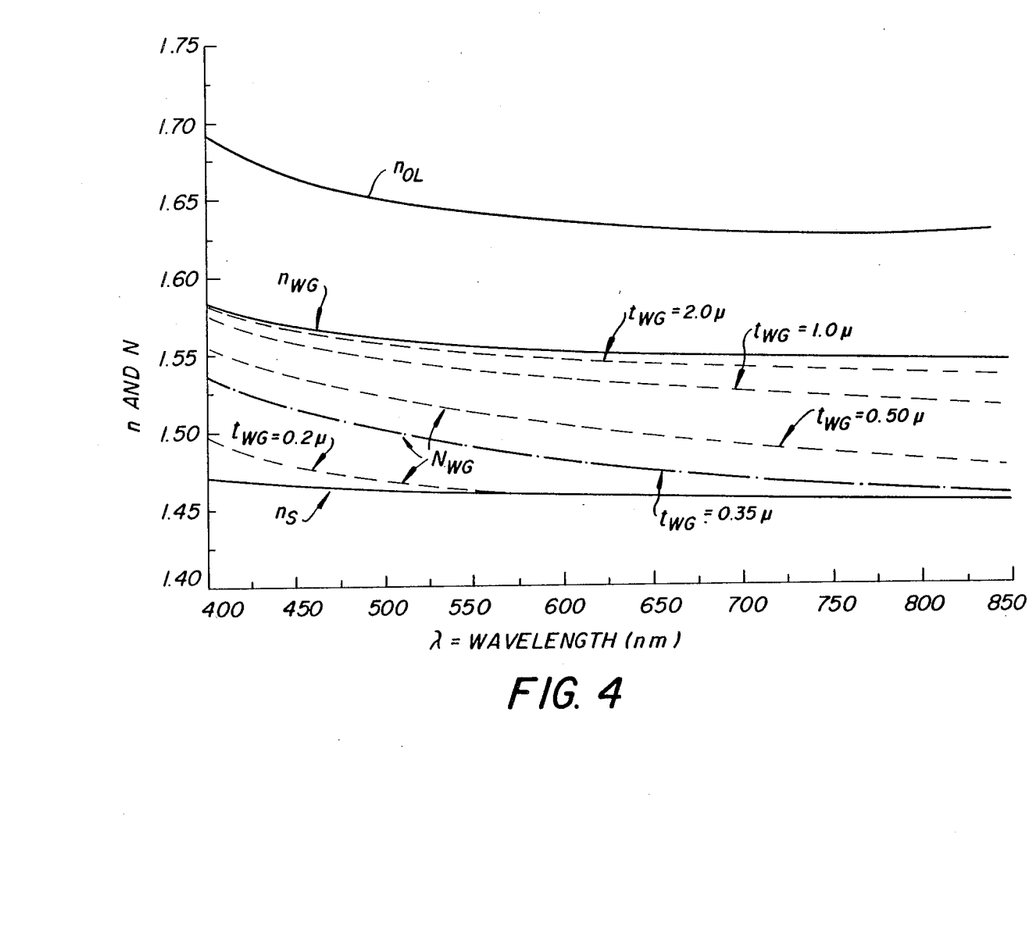
FIG. 4 is a series of dispersion curves illustrating the relationship between wavelength and effective refractive index for a particular waveguide material of different thicknesses.

Waveguide layer WG is disposed on a smooth upper surface of the substrate and comprises an optically transparent thin-film of uniform thickness, $t_{WG}$. As indicated above, the waveguide has a bulk refractive index $n_{WG}$ which is between that of the substrate and overlay, and has an "effective" refractive index $N_{WG}$ which, as shown in FIG. 4, varies with the waveguide thickness, up to a value which equals its bulk refractive index value. Preferably, the bulk index of the waveguide, $n_{WG}$, is at least 0.05 greater than that of the substrate, $n_S$, at all wavelengths within the intended range of achromatization. The waveguide thickness, $t_{WG}$, is selected to be sufficiently thin as to support only a single mode of propagation of radiation within the waveguide over the wavelength band selected. The waveguide material must be transparent throughout the achromatization range. While such materials may be organic, polymeric or inorganic, a preferred material comprises an organic monomer, such as one of the low molecular weight organic compounds disclosed in the commonly assigned U.S. patent application Ser. No. 273,785, filed Nov. 21, 1988 in the names of J. C. Brazas and D. E. Machiele, pending. A particularly preferred material is a phenylindane compound having the structure wherein R is selected from the group consisting of nitro, amino, carboxyl, foramido groups, carbamoyl groups and heterocyclic groups derived from amino or carboxyl groups.

The shaped overlay OL comprises an optically transparent (throughout the achromitzation range) thin-film which, except for its optionally tapered edges T, is of uniform thickness, $t_{OL}$. The overlay is shaped, as seen in a top plan view, to achieve a desired change in the direction of propagation of an incident wavefront, in this case to bring the wavefront to a focal point FP, as shown. Note, the overlay may have any of a variety of contours designed to change the direction of radiation propagating in the underlying waveguide. For example, the overlay may be triangular in shape, thereby functioning to simply angularly deflect the propagating wavefront. The bulk refractive index of the overlay, $n_{OL}$, is preferably at least 0.05 greater than that of the waveguide at all wavelengths within the intended achromatization range. This refractive index difference is intended to ensure a useful refracting power for the mode-index device. Like the waveguide material, the material of the overlay should have low dispersion and may be organic, polymeric or inorganic. A preferred material for the overlay comprises an organic monomer, such as one of the organic binders disclosed in the commonly assigned U.S. Pat. No. 4,783,393 to J. C. Brazas et al. A particularly preferred binder has the structure where R is a substituent which has been added to the core structure and may comprise naphthol, bromophenyl and/or methoxy phenyl groups.

According to one aspect of the present invention, the overlay thickness, $t_{OL}$, is chosen so that, for given substrate, superstrate and waveguide materials, as well as for a given waveguide thickness (the substrate and superstrate being considered to be "infinitely" thick), the mode-index element is "optimally" achromatized for a specific wavelength range of interest. What is meant by "optimal" achromatization is explained below.

As a general principle, an optical element is perfectly achromatized over a certain wavelength range when the ratio of the *effective* refractive index of the element to that of the media in which the radiation travels in approaching such element (in the present case, the waveguide WG) is constant at every wavelength within such wavelength range. While the element and the media will have different effective refractive indices at each wavelength within the range of interest, perfect achromatization requires that the ratios of such effective refractive indices at each wavelength must remain constant throughout the range of achromatization. Note, while it is never possible, with any type of optical element (waveguide or bulk), to achieve perfect achromatization over any substantial range of wavelengths, it is possible to optimize the achromitzation of waveguide elements over any wavelength range, by minimizing the deviation of such ratio from a mean or nominal value over such range. Mathematically speaking, the condition for perfect achromatization can be expressed as the normalized dispersion, $$\frac{d(N_E/N_{WG})}{d\lambda} = 0$$

In a four-layer waveguide element, the above condition for optimum achromatization can be best achieved by the proper selection of materials and thicknesses for the waveguide and overlay components. When the aforementioned condition of minimum deviation is achieved, the waveguide optical element will be as insensitive as possible to wavelength changes within the specified achromitzation range.

As noted above, it is the "effective" refractive indices N of the materials which determine whether or not an optical element is achromatized with respect to its surrounding media. In bulk optical systems where the optical element is relatively thick and massive, the surrounding media, air, has no significant effect on the refracting properties of the optical element per se, and the "effective" refractive index of such element, $N_e$, is identical to its so-called "bulk" index of refraction, $n_e$; that is, in bulk optical systems $N_e = n_e$. However, in waveguide optical systems where the optical waveguide in which the radiation is propagating is of the order of microns or sub-microns in thickness, the effective refractive index, $N_{WG}$, is dependent on the angle of internal reflection within the waveguide and is thickness dependent, up to a waveguide thickness of several microns. Moreover, at such minute waveguide thicknesses, the effective refractive index of the waveguide is influenced by the respective refractive indices of the materials in contact with the waveguide, in this case, $n_S$ and $n_{OL}$.

Referring to FIGS. 3–5, FIG. 3 plots, as a function of wavelength, the bulk indices of refraction of silicone dioxide, and the two organic monomers structurally identified above and used as the preferred waveguide and overlay materials. As is apparent, at all wavelengths within the wavelength range of 400–850 nanometers, the condition, $n_{SS} \leq n_S < n_{WG} < n_{OL}$, is satisfied, where the superstrate is understood to be air (n=1). Referring to FIG. 4, the dispersion curves plotted in dashed lines illustrate the manner in which the "effective" refractive index of the waveguide, $N_{WG}$, varies with wavelength and waveguide thickness, $t_{WG}$, for the various waveguide thicknesses of 0.2, 0.35, 0.50, 1.0 and 2.0 microns. Note, as the waveguide increases in thickness to several microns, its effective refractive index, $N_{WG}$, approaches its bulk index, $n_{WG}$.

Figure 5:
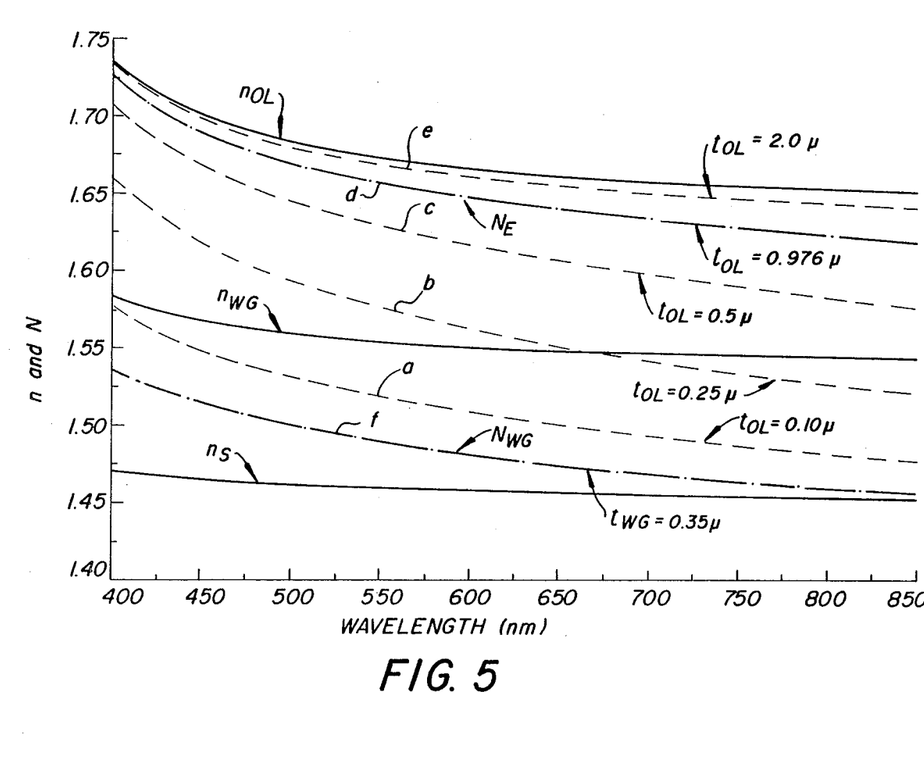
FIG. 5 presents additional dispersion curves illustrating the manner in which effective refractive index of a mode-index element varies with wavelength for the various thicknesses of an optical overlay.
Figure 6:
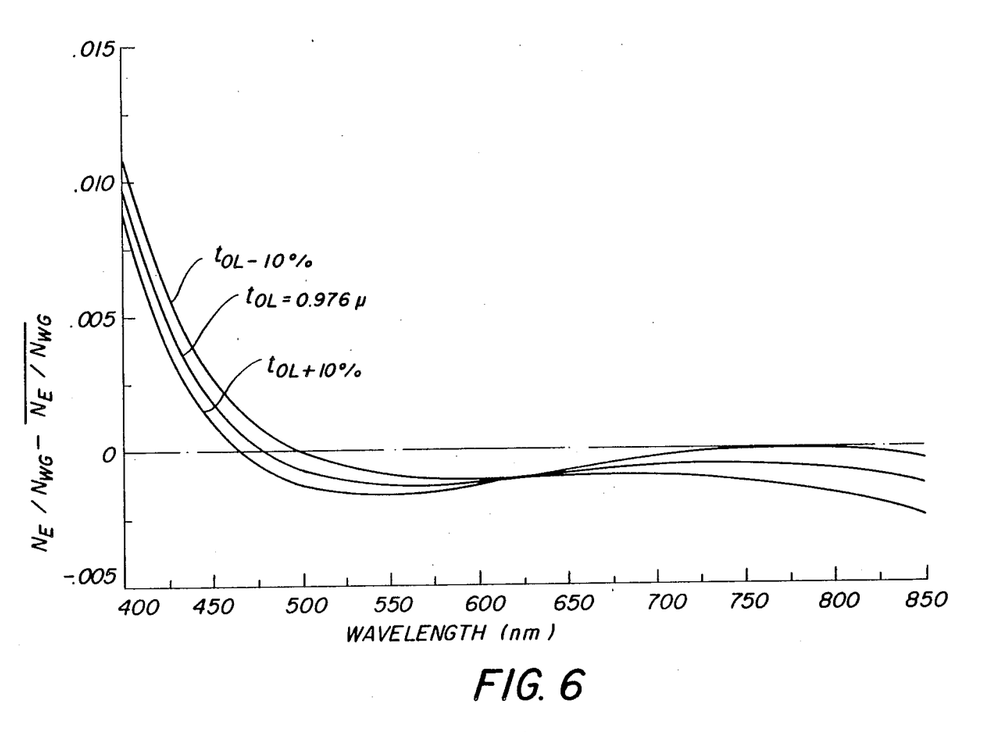
FIGS. 6 and 7 respectively present a series of curves showing how the $N_E/N_{WG}$ ratio and nominal focal length of a particular mode-index lens vary with wavelength for different overlay thickness.

In FIG. 5, dispersion curves a-e illustrate the manner in which the effective refractive of the waveguide element, $N_E$, varies as a function of wavelength and overlay thickness, $t_{OL}$, for the various overlay thicknesses of 0.1, 0.25, 0.5, 0.976 and 2.0 microns. These curves assume predetermined waveguide, substrate and superstrate materials and thicknesses. Also plotted in FIG. 5 as dispersion curve f is the effective refractive index of the waveguide $N_{WG}$ as a function of wavelength for a waveguide thickness, $t_{WG}$, of 0.35 microns. It can be shown that it is not until the overlay thickness is increased to 0.976 microns that the optimal achromatization condition defined above is satisfied, i.e., $d(N_E/N_{WG})/d\lambda = 0$, for the achromitzation range of 500–850 nanometers. In FIG. 6, the deviation of the $N_E/N_{WG}$ ratio from a normalized value V for the achromitzation range of 500 to 850 nanometers is shown for three different overlay thicknesses, viz, $t_{OL} = 0.976$ microns and ±10% of such value. The curves of FIG. 6 are based on the aforementioned materials and thicknesses of the four-layer waveguide assembly.

Figure 7:
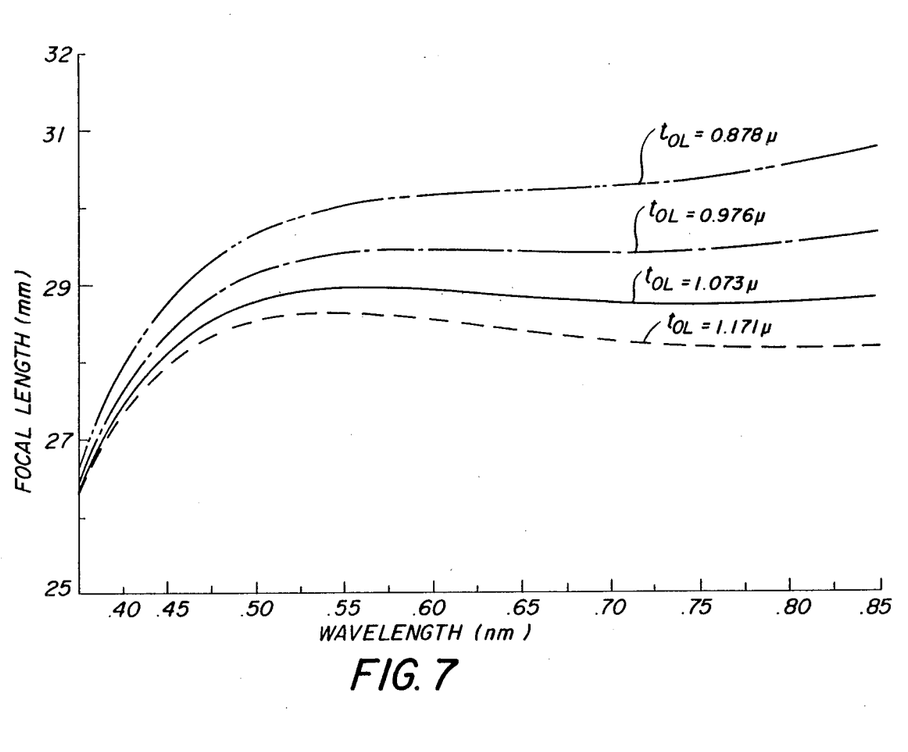

The curves of FIG. 7 show how the focal length of a four-layer mode-index lens varies with wavelength for the three different overlay thicknesses shown in FIG. 6, i.e., the optimum overlay thickness of 0.976 microns and ±10% and −20% changes in this value. These curves are based on a lens fabricated from the aforementioned preferred materials and a waveguide thickness of 0.35 microns.

Figure 8:
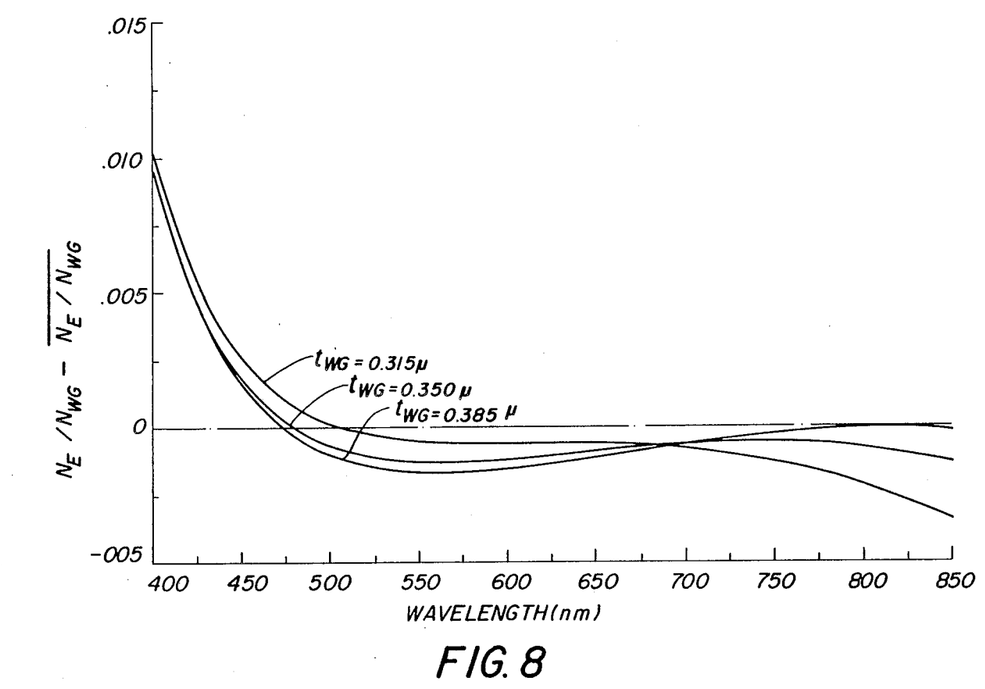
FIGS. 8 and 9 respectively show how the $N_E/N_{WG}$ ratio and focal length of a particular four-layer mode-index lens are effected by changes in waveguide thickness.
Figure 9:
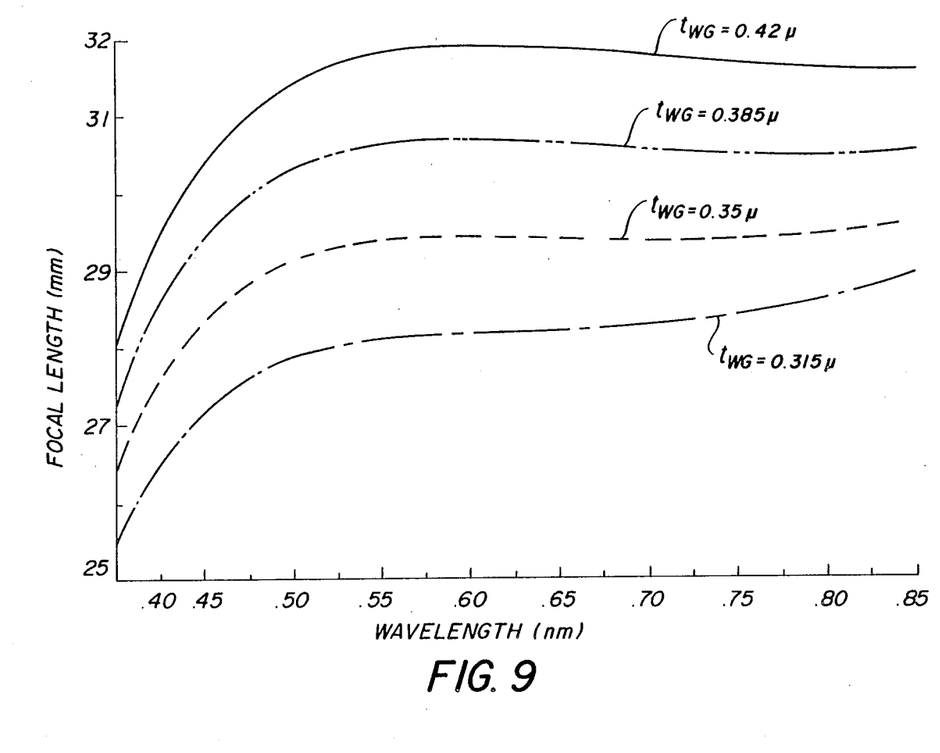

The curves of FIGS. 8 and 9 show the effects on the $N_E/N_{WG}$ ratio and lens focal length caused by ±10% and +20% changes in the waveguide thickness. These curves assume an overlay thickness of 0.976 microns and the same materials for the four-layer, mode-index lens described above.

For FIGS. 7 and 9 the optimal achromatization for a four-layer design has been applied to an actual device. It should be understood that actual devices may have boundaries or non-uniformities of the effective refractive indices which have not been included for the selection of the four-layer design.

For the lenses of FIGS. 7 and 9, the device boundary is not defined by an effective index step, rather, an axial gradient Neff as the result of a linear change in thickness over a 1 millimeter length. As can be seen in these figures, the presence of this axial gradient affects the value of the optimum overlay thickness, $t_{OL}$, and the waveguide thickness, $t_{WG}$, for FIGS. 7 and 9, respectively.

The following examples describe different four-layer achromatized mode-index lenses and methods for making such lenses.

EXAMPLE 1

A four-layer achromatized mode-index lens was made in the following manner: First an organic monomer having the chemical structure described below was vapor deposited, by conventional techniques, on the smooth surface of a smooth silicon dioxide substrate. The rate of material deposition was 5 angstroms/second, and the substrate was at room temperature at the start of the deposition process. The vacuum chamber pressure was $5\times10^{-6}$ Torr, and the spacing between substrate and source material was 65 centimeters. Vapor deposition continued until the thickness of the monomer reached about 0.35 microns. At such a thickness, the vapor deposited layer of the particular material will support only a single propagation mode (i.e., m=0) over the spectral band of interest, i.e., 500 to 850 nanometers. The chosen thickness gave rise to the effective dispersion curve f of FIG. 5. The layer formed constitutes the waveguide layer WG shown in FIG. 1.

A second organic monomer having the chemical structure described below was vapor deposited atop the waveguide layer. This second thin-film layer (i.e., the overlay) was given the shape of an equiconvex lens, as viewed from the top, having a focal length of 30 mm. Tapered edges were produced on the overlay by the process disclosed in the commonly assigned U.S. patent application No. 377,699, filed on Jul. 10, 1989 in the name of J. C. Brazas, pending. Vapor deposition continued until the overlay thickness reached 0.976 microns. Such a thickness of the overlay gave rise to dispersion curve d. To provide a reasonably strong refractive power, the monomers were chosen to have bulk refractive indices which differ by at least 0.1 over the wavelength range of interest.

The first organic monomer (i.e., the material of the waveguide) has the chemical structure, where R is $-NHCOCH_2C(CH_3)_3$. This particular organic monomer has a bulk refractive index of 1.545 at 632.8 nm and a dispersion represented by curve $n_{WG}$ in FIGS. 4 and 5. As indicated above, this material is one of several suitable waveguide materials disclosed in the above-identified U.S. patent application No. 273,785.

The second organic material (i.e., the material of the overlay) is a mixture of monomer having the structure, This particular organic monomer has a bulk refractive index of 1.654 at 632.8 nm and a dispersion represented by curve $n_{OL}$ in FIGS. 4 and 5. It is one of several suitable overlay materials disclosed in the commonly assigned U.S. Pat. No. 4,783,393 to J. C. Brazas et al.

Measurement of the experimental focal length of the mode-index lens so formed involved fracturing the waveguide near the focal line, imaging the decoupled light onto a charge-coupled device (CCD) and determining the focal length shift at various wavelengths and using the well known Hartmann test to observe the transverse ray aberration. FIG. 7 illustrates how the focal length of such lens varies with wavelength. The points represent the actually measured focal length of the lens, and the solid line represents the predicted focal length for the specific materials and thicknesses chosen.

EXAMPLE 2

Figure 10:
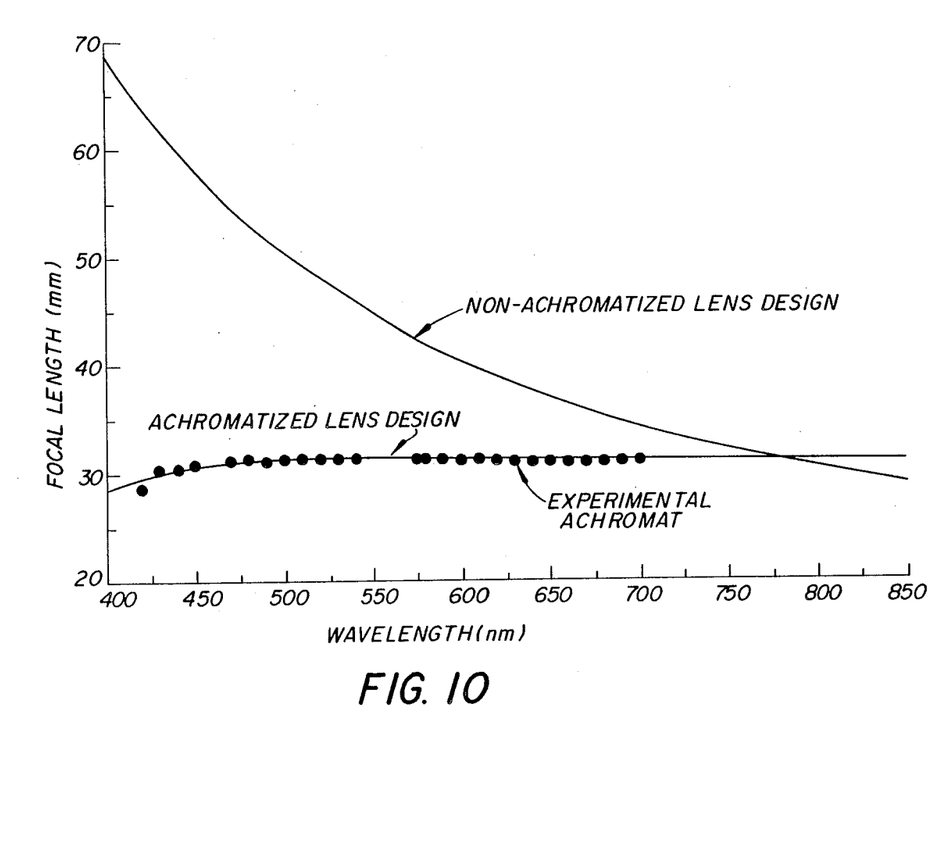
FIG. 10 compares the predicted change in focal length with wavelength with the actually measured focal length change for a particular lens design.
Figure 11:
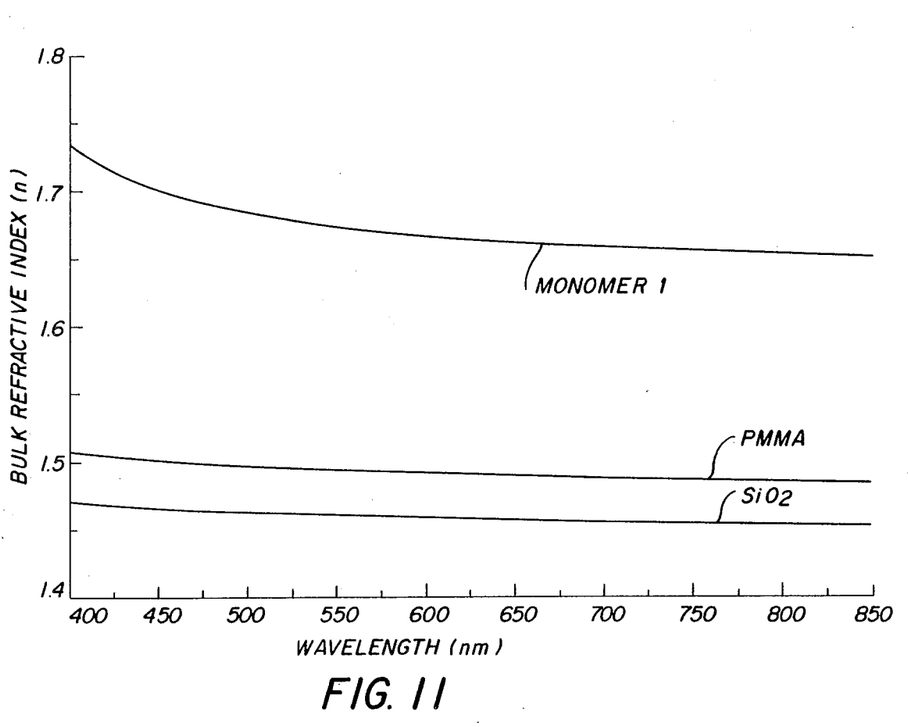
FIG. 11 shows the bulk refractive indices of the materials used in an alternate lens design.
Figure 12:
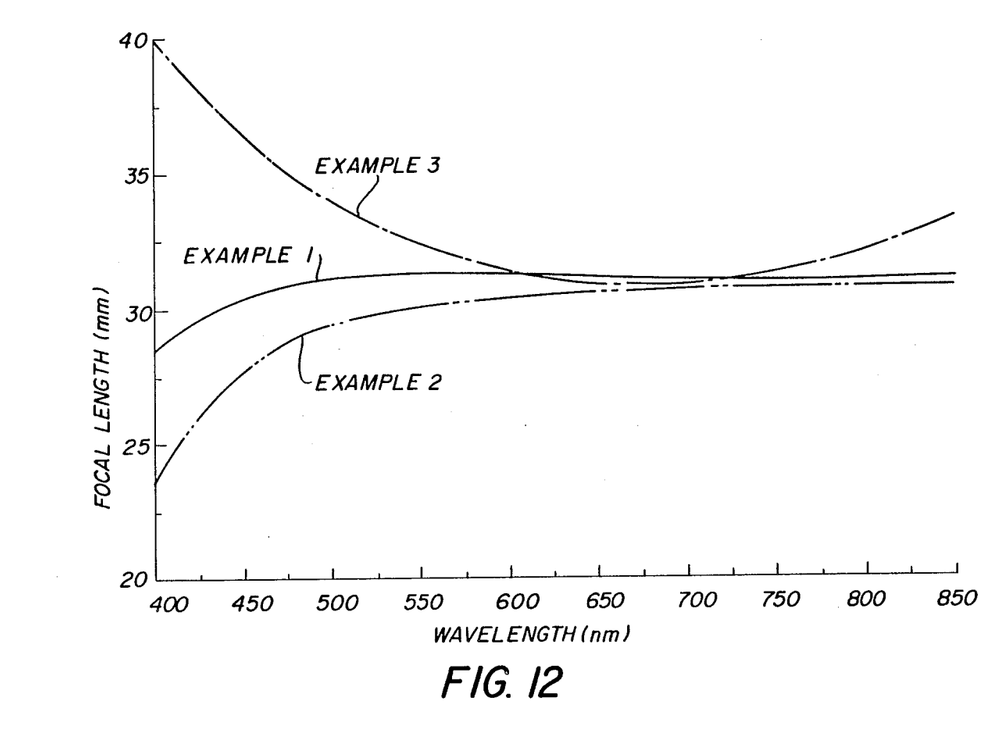
FIG. 12 compares the achromaticities of three different materials sets where the thickness of an overlay was selected to optimally achromatize the lens.
Figure 13:
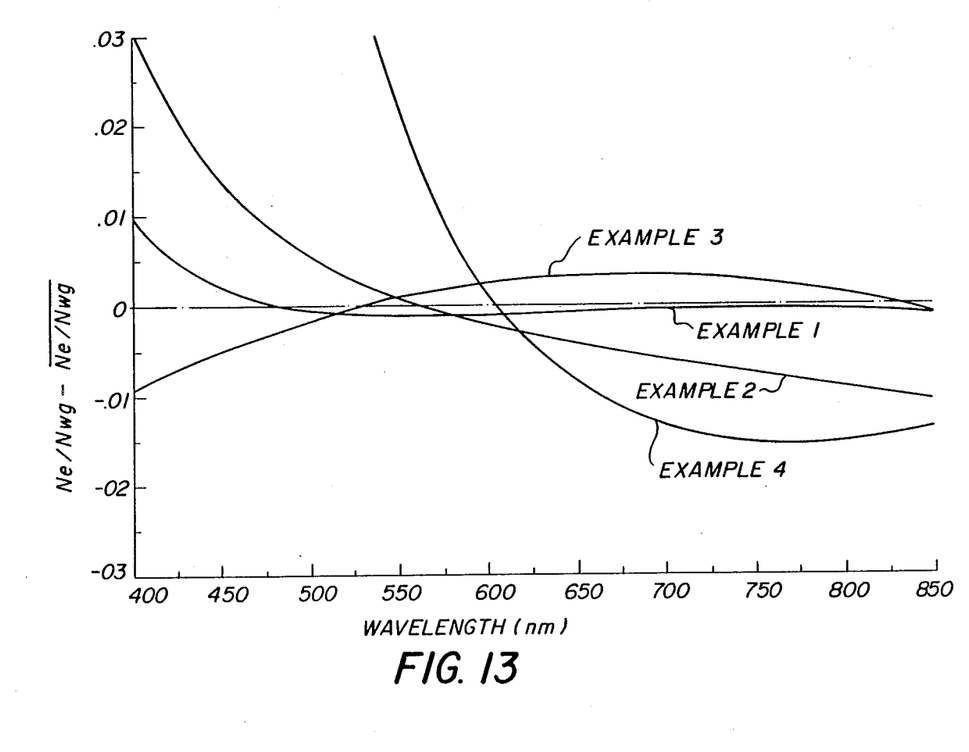

A four-layer mode-index lens is fabricated by spin-coating, in a conventional manner, a thin-film of poly(methyl methacrylate), PMMA, on a silicon dioxide substrate. Such PMMA layer constitutes the waveguide layer, WG, shown in FIG. 1. PMMA has an index of refraction of 1.492 at a wavelength of 632.8 mm. The relationship between wavelength and bulk refractive index is shown in FIG. 10 for the wavelength range of 400 to 850 nm. In this example, the substrate, superstrate and overlay materials are the same as those used in Example 1, and the respective bulk indices of these materials are also shown in FIG. 10. The thickness of the PMMA waveguide was again selected to support but a single mode of propagation over the bandpass of interest (i.e. 500-850 nm), and the particular waveguide thickness selected was 1.0 micron. The overlay thickness, $t_{OL}$, was chosen in the same manner as that used to optimize $t_{OL}$ in Example 1, i.e., to best satisfy the condition $d(N_E/N_{WG})/d\lambda=0$. In this example, the optimum overlay thickness was calculated to be 2.5 microns. FIG. 11 illustrates the dependence of focal length on wavelength for the mode-index lens of Examples 1 and 2. As is apparent, the lens of Example 2 is not as well achromatized as the lens of Example 1. But, given the materials of Example 2, as well as the waveguide thickness supporting only a single mode of propagation, this lens is as achromatized as possible, based on the selection of the overlay thickness.

EXAMPLE 3

In this example, the waveguide and overlay layers were chosen to be of the same material, namely, the overlay material of the previous examples. The substrate is again silicon dioxide, that was used in the previous example.

The thickness of the waveguide was selected to support a single mode of propagation over the spectral band of interest (i.e. $t_{WG}=0.2$ μm). The overlay thickness, $t_{OL}$, was chosen in the same manner as the previous examples.

An optimum was selected, 0.2 μm. Again a lens was designed to have a focal length of 30 mm using the waveguide system suggested here. The paraxial focal length was then examined through the spectral band of interest as seen in the curve of FIG. 11. As expected, the optimum design of this example does not have as good achromatization properties at the shorter and longer wavelengths as compared to Example 1.

The invention has been described in detail with particular reference to a certain preferred embodiment thereof, but it will be understood that variations and modifications can be effected within the spirit and scope of the invention.

I claim:

1. An optimally achromatized mode-index optical element for changing the direction of propagation of polychromatic radiation propagating in an optical waveguide comprising a slab of transparent material of substantially uniform thickness, said mode-index optical element comprising a shaped optical overlay disposed on a portion of said waveguide, said overlay being of substantially uniform thickness and comprising a transparent material different from that of said waveguide, the respective materials and thicknesses of said waveguide and overlay being chosen to best satisfy the condition $d(N_E/N_{WG})/d\lambda=0$, where $N_E$ is the effective refractive index of said mode-index optical element, $N_{WG}$ is the effective refractive index of said waveguide, and $\lambda$ is the wavelength of radiation within a desired wavelength range of achromatization.

2. The mode-index optical element as defined by claim 1 wherein said waveguide material comprises a phenylidane compound having the structure wherein R is selected from the group consisting of nitro, amino, carboxyl, foramido groups, carbamoyl groups and heterocyclic groups derived from amino or carboxyl groups.

3. The mode-index optical element as defined by claim 1 wherein said overlay material comprises an organic monomer having the chemical structure where R is a substituent which has been added to the core structure and may comprise naphthol, bromophenyl and/or methoxy phenyl groups.

4. The mode-index optical element as defined by claim 1 wherein said waveguide material comprises a phenylidane compound having the structure wherein R is selected from the group consisting of nitro, amino, carboxyl, foramido groups, carbamoyl groups and heterocyclic groups derived from amino or carboxyl groups, and wherein said overlay material comprises an organic monomer having the chemical structure where R is a substituent which has been added to the core structure and may comprise naphthol, bromophenyl and/or methoxy phenyl groups.

5. The mode-index optical element as defined by claim 1 wherein the material of said waveguide comprises an organic monomer having the structure, where R is $-NHCOCH_2C(CH_3)_3$, and wherein the material of said overlay comprises an organic monomer having the structure, 6. The mode-index optical element as defined by claim 5 wherein the thickness of said waveguide is such as to support only a single mode of propagation of radiation within said wavelength range, and wherein the overlay thickness is about 1.0 micron.

7. An optically achromatized mode-index lens for focusing polychromatic radiation propagating in an optical waveguide, said waveguide comprising a slab of transparent material of substantially uniform thickness, said mode-index lens comprising a lens-shaped optical overlay disposed on a portion of said waveguide, said overlay being of substantially uniform thickness and comprising a material different from that of said waveguide, the respective thicknesses and materials of said waveguide and overlay being chosen so that the focal length of said lens varies less than 10% over the wavelength range of from 500 to 850 nm.

* * * * *